(12) United States Patent
Chang et al.

(10) Patent No.: US 8,053,101 B2
(45) Date of Patent: Nov. 8, 2011

(54) LITHIUM ION RECHARGEABLE BATTERY

(75) Inventors: Seok-Gyun Chang, Yongin-si (KR);
Jung-Seog Kim, Yongin-si (KR);
Yoo-Eup Hyung, Yongin-si (KR);
Yong-Tae Kim, Yongin-si (KR);
Sang-Bong Nam, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1213 days.

(21) Appl. No.: 11/646,491

(22) Filed: Dec. 28, 2006

(65) Prior Publication Data

US 2007/0154789 A1   Jul. 5, 2007

(30) Foreign Application Priority Data

Dec. 29, 2005  (KR) .................. 10-2005-0134538
Dec. 29, 2005  (KR) .................. 10-2005-0134542
Dec. 29, 2005  (KR) .................. 10-2005-0134549

(51) Int. Cl.
*H01M 2/14* (2006.01)
(52) U.S. Cl. .................. 429/129; 429/163; 429/164
(58) Field of Classification Search .............. 429/231.95
See application file for complete search history.

(56) References Cited

U.S. PATENT DOCUMENTS

| | | | |
|---|---|---|---|
| 4,255,500 A * | 3/1981 | Hooke | 429/94 |
| 5,525,437 A | 6/1996 | Freluche et al. | |
| 5,776,630 A | 7/1998 | Bohnstedt | |
| 5,948,562 A | 9/1999 | Fulcher et al. | |
| 6,007,936 A * | 12/1999 | Iwase et al. | 429/94 |
| 6,346,344 B1 * | 2/2002 | Song et al. | 429/61 |

(Continued)

FOREIGN PATENT DOCUMENTS

CN   1341976 A   3/2002

(Continued)

OTHER PUBLICATIONS

The Chinese Examination Report dated Jun. 30, 2010 issued by the SIPO corresponding to Korean Patent Application No. 10-2005-0134549 and its English translation attached.

(Continued)

*Primary Examiner* — Ula C. Ruddock
*Assistant Examiner* — Patricia Davis
(74) *Attorney, Agent, or Firm* — Robert E. Bushnell, Esq.

(57) ABSTRACT

A lithium ion secondary battery in which an electrode assembly is easily impregnated with an electrolyte is provided. The lithium ion secondary battery includes an electrode assembly wrapped by a sealing tape, an upper insulating plate positioned on the top of the electrode assembly, a lower insulating plate positioned at the bottom of the electrode assembly, a case for accommodating the electrode assembly, and a cap assembly for sealing the case. In one embodiment, the upper insulating plate has holes which may include a form of a mesh. In another embodiment, the lower insulating plate has various shapes of recesses on the surface. The surface of the lower insulating plate may be coated with a material that has an affinity for the electrolyte. An inner surface of the case may have various shapes of recesses or grooves. The sealing tape may be coated with a material that has an affinity for an electrolyte. Therefore, according to the principles of the present invention, the electrode assembly is easily impregnated with the electrolyte, and overall performance of the lithium ion secondary battery is improved.

25 Claims, 9 Drawing Sheets

U.S. PATENT DOCUMENTS

| | | | |
|---|---|---|---|
| 7,470,486 B2 * | 12/2008 | Lee et al. | 429/143 |
| 2006/0081530 A1 * | 4/2006 | Beard | 210/500.27 |
| 2006/0159989 A1 | 7/2006 | Bouffard | |

FOREIGN PATENT DOCUMENTS

| | | | |
|---|---|---|---|
| JP | 06-150971 | | 5/1994 |
| JP | 10-284046 | | 10/1998 |
| JP | 10284046 | * | 10/1998 |
| JP | 10-308204 | | 11/1998 |
| JP | 2001-210384 | | 8/2001 |
| JP | 2001273933 | * | 10/2001 |
| JP | 2002-198099 | | 7/2002 |
| JP | 2004111105 | * | 4/2004 |
| JP | 2004111105 A | | 4/2004 |
| JP | 2004111105 A | | 6/2004 |
| KR | 10-1998-027706 | | 7/1998 |
| KR | 2019990023885 A | | 7/1999 |
| WO | WO 2005/067079 | | 7/2005 |

OTHER PUBLICATIONS

Chinese Office Action issued on Dec. 21, 2011 in the corresponding Chinese Patent Application No. 200910008533.3. English translation included.

Chinese Office Action issued on Jul. 5, 2011, corresponding to KR 10-2005-0134583, 10-2005-0134542, and 10-2005-0134549. English translation included.

Korean Notice of Allowance issued by KIPO, dated Oct. 29, 2007, corresponding to Korean Patent Application No. 10-2005-0134549, together with Request for Entry.

* cited by examiner

LITHIUM ION RECHARGEABLE BATTERY

CLAIM OF PRIORITY

This application makes reference to, incorporates the same herein, and claims all benefits accruing under 35 U.S.C. §119 from applications earlier filed in the Korean Intellectual Property Office on Dec. 29, 2005 and there duly assigned Serial Nos. 10-2005-0134538, 10-2005-0134542, and 10-2005-0134549.

BACKGROUND OF THE INVENTION

1. Field of the Invention

The present invention relates to a lithium ion secondary battery, and more particularly, to a lithium ion secondary battery in which the impregnation property of an electrolyte is improved.

2. Description of Related Art

Recently, compact and light electrical and electronic apparatuses such as mobile telephones, notebook computers, and camcorders have been actively developed and produced. Battery packs are built in the portable electrical and electronic apparatuses so that the portable electrical and electronic apparatuses can used in a place where an additional power source is not provided. The built-in battery pack includes at least one battery that outputs a voltage of a uniform level in order to drive the portable electrical and electronic apparatus for a predetermined period.

A secondary battery that can be charged and discharged is recently used as the battery pack in consideration of economics. The secondary batteries include a nickel-cadmium (Ni—Cd) battery, a nickel-hydrogen (Ni—H) battery, a lithium metal battery, and a lithium ion battery.

The Ni—Cd battery and the Ni—H battery have been widely used as power sources of portable electronic apparatuses. The lithium ion secondary battery, however, has many advantages over the Ni—Cd battery and the Ni—H battery. The operation voltage of the lithium ion secondary battery is commonly 3.6V, which is three times higher than the operation voltages of the Ni—Cd battery and the Ni—H battery. The energy density per unit weigh of the lithium ion secondary battery is high. Therefore, the use of the lithium ion secondary battery rapidly increases.

In the lithium ion secondary battery, lithium based oxides are used as positive electrode active materials and carbon materials are used as negative electrode active materials. In general, the lithium ion secondary battery is divided into a liquid electrolyte battery and a polymer electrolyte battery depending on the kind of an electrolyte. The battery in which the liquid electrolyte is used is referred to as a lithium ion battery, and the battery in which the polymer electrolyte is used is referred to as a lithium polymer battery. Also, the lithium ion secondary battery is manufactured to have various shapes such as a cylinder type, a polygon type, and a pouch type.

In general, the cylinder type lithium ion secondary battery includes an electrode assembly fabricated by cylindrically winding a positive electrode plate coated with positive active materials, a negative electrode plate coated with negative active materials, and a separator positioned between the positive electrode plate and the negative electrode plate. The separator prevent a direct contact between the positive electrode plate and the negative electrode plate, which otherwise would cause a short, but lithium ions could move through the separator. The cylinder type lithium ion secondary battery also includes a cylinder type case in which the electrode assembly is accommodated, an electrolyte injected into the cylinder type case in which the lithium ions move, and a cap assembly coupled with the upper end of the cylinder type case.

The cylinder type lithium ion secondary battery is manufactured by the following method. First, a positive electrode plate, a negative electrode plate, and a separator between the positive and negative electrodes are laminated together. The positive electrode is coated with a positive active materials, and connected to a positive electrode tab. The negative electrode plate is coated with the negative active materials and connected to a negative electrode tab. The laminated plate, which includes layers of the positive and negative electrode and the separator, is cylindrically wound to manufacture an electrode assembly. Then, the cylinder type electrode assembly is inserted into a cylinder type case so that the electrode assembly is fixed in the cylinder type case. Electrolyte is injected into the cylinder type case, and then, the cylinder type case is sealed by a cap assembly to complete the cylinder type lithium ion secondary battery.

Before inserting the electrode assembly into the cylinder type case, a lower insulating plate is inserted in order to insulate the electrode assembly from the cylinder type case. After inserting the electrode assembly into the cylinder type case and before sealing the cylinder type case, an upper insulating plate is inserted in order to insulate the electrode assembly from the cap assembly.

In the case of the polygon type lithium ion secondary battery, an insulating case for supporting the cap assembly and a lower insulating plate are inserted. The insulating case insulate the electrode assembly from a terminal plate, and the lower insulating plate insulate the electrode assembly from a polygon type case.

Since the insulating plates are commonly formed of polyethylene (PE) or polypropylene (PP), the insulating plates do not have an affinity for the electrolyte. Therefore, the electrode assembly is not sufficiently impregnated with the electrolyte because of the insulating plates that have no affinity for the electrolyte. In the conventional upper insulating plate, holes are formed on the insulating plate around an opening into which a center pin is inserted. However, the size of holes are not sufficient for the electrolyte to freely flow to the electrode assembly positioned under the upper insulating plate. The holes around the opening may be clogged with the electrolyte preventing the flow of electrolyte. Also, the lower insulating plate is attached to the electrode assembly, so that the electrode assembly is not sufficiently impregnated with the electrolyte contained in the lower part of the case.

Furthermore, the density of the electrode assembly increases proportional to the capacity of the battery, so that the external diameter of the electrode assembly increases. When the external diameter of the electrode assembly increases, a space between the cylinder type case and the electrode assembly is reduce, so that it is difficult to impregnate the electrode assembly with the electrolyte. Therefore, it is necessary to form the upper insulating plate and the lower insulating plate in a manner that the electrode assembly is easily impregnated with the electrolyte.

A sealing tape is attached to the outer circumference of the electrode assembly in order to support and protect the wound electrode assembly. Since the sealing tape is commonly formed of polyethylene (PE) or polypropylene (PP), the sealing tape does not have an affinity for the electrolyte. In the case of the cylinder type lithium ion battery (or the polygon type lithium ion battery), the case is made of metals such as aluminum, steel, and alloys. The inner surface of the case has an affinity for the electrolyte unlike the sealing tape.

When the electrode assembly is inserted into the cylinder type case, the outer circumference of the electrode assembly where the sealing tape is wound contacts the inner surface of the case. Therefore, the electrode assembly is prevented from being impregnated with the electrolyte due to the sealing tape that does not have an affinity for the electrolyte. Furthermore, as the capacity of the battery increases, the density of the electrode assembly increases, so that the degree of contact between the case and the sealing tape increases. In such a case, it is necessary to change the shape of the inner surface of the case to make the electrode assembly quickly impregnated with the electrolyte.

SUMMARY OF THE INVENTION

In order to solve the above-described problems, it is an object of the present invention to provide a lithium ion secondary battery in which an upper insulating plate, a case, and a lower insulating plate are made of a material that is easily impregnated with an electrolyte so that an electrode assembly of high density can be easily impregnated with the electrolyte.

It is another object of the present invention to provide a lithium ion secondary battery in which a lower insulating plate is formed to be easily impregnated with an electrolyte so that an electrode assembly of high density can be easily impregnated with the electrolyte.

It is still another object of the present invention to provide a lithium ion secondary battery in which a recess or roughness is formed on a inner surface of a case so that an area of the inner surface of the case increases and an electrode assembly can be easily impregnated with the electrolyte.

In order to achieve the foregoing objects of the present invention, there is provided a lithium ion secondary battery comprising a case having an open top end and a closed bottom end at an opposite side of the top end, an electrode assembly disposed inside the case, a lower insulating plate disposed between the electrode assembly and the bottom end of the case, and a cap assembly for sealing the case. A recesse of a predetermined depth is formed on the lower insulating plate.

The recess may be in the form of a check pattern, may be a radial pattern, or may be in a mixed form of various patterns. A material of the lower insulating plate maybe polyethylene (PE) or polypropylene (PP). The surface of the lower insulating plate may be coated with polyvinyldifluride (PVdF) material that has an affinity for the electrolyte. The polyvinyldifluride (PVdF) material may be one selected from the group consisting of PVdF 761, PVdF 2801, and a mixture of the PVdF 761 and the PVdF 2801.

In order to achieve the above objects, there is provided a lithium ion secondary battery comprising a case having an open top end and a closed bottom end at an opposite side of the top end, an electrode assembly disposed inside the case, a cap assembly for sealing the open top of the case, a lower insulating plate disposed between the electrode assembly and the bottom end of the case, an upper insulating plate disposed between the electrode assembly and the cap assembly. A plurality of holes is formed on the upper insulating plate, and a recess of a predetermined depth is formed on the lower insulating plate.

The holes on the upper insulating plate may be in a form of a mesh. The upper insulating plate and the lower insulating plate may be made of polyethylene (PE), polypropylene (PP), or felt. The upper insulating plate and the lower insulating plate may be coated with polyvinyldifluride (PVdF) material. The polyvinyldifluride (PVdF) material may be PVdF 761, PVdF 2801, or a mixture of the PVdF 761 and the PVdF 2801.

In order to achieve the above objects, there is provided a lithium ion secondary battery comprising a case having an open top end and a closed bottom end at an opposite side of the top end, an electrode assembly disposed inside the case, a cap assembly sealing the open top end of the case, a sealing tape wrapping the outer circumference of the electrode assembly. A recess is formed on an inner surface of the case where the inner surface of the case partially contacts the sealing tape.

The recess may have a shape of a straight line stretched from the top end of the case to the bottom end of the case. The sealing tape may be coated with polyvinyldifluride (PVdF) material. The polyvinyldifluride (PVdF) material may be PVdF 761, PVdF 2801, or a mixture of the PVdF 761 and the PVdF 2801.

In order to achieve the above objects, there is provided a lithium ion secondary battery comprising a case having an open top end and a closed bottom end at an opposite side of the top end, an electrode assembly disposed inside the case, a cap assembly sealing the open top end of the case, a sealing tape wrapping the outer circumference of the electrode assembly. An inner surface of the case is made rough. The sealing tape is coated with polyvinyldifluride (PVdF) material. The polyvinyldifluride (PVdF) is PVdF 761, PVdF 2801, or a mixture of the PVdF 761 and the PVdF 2801.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Hereinafter, preferred embodiments of the present invention will be described in detail with reference to the accompanying drawings.

Figure 1:
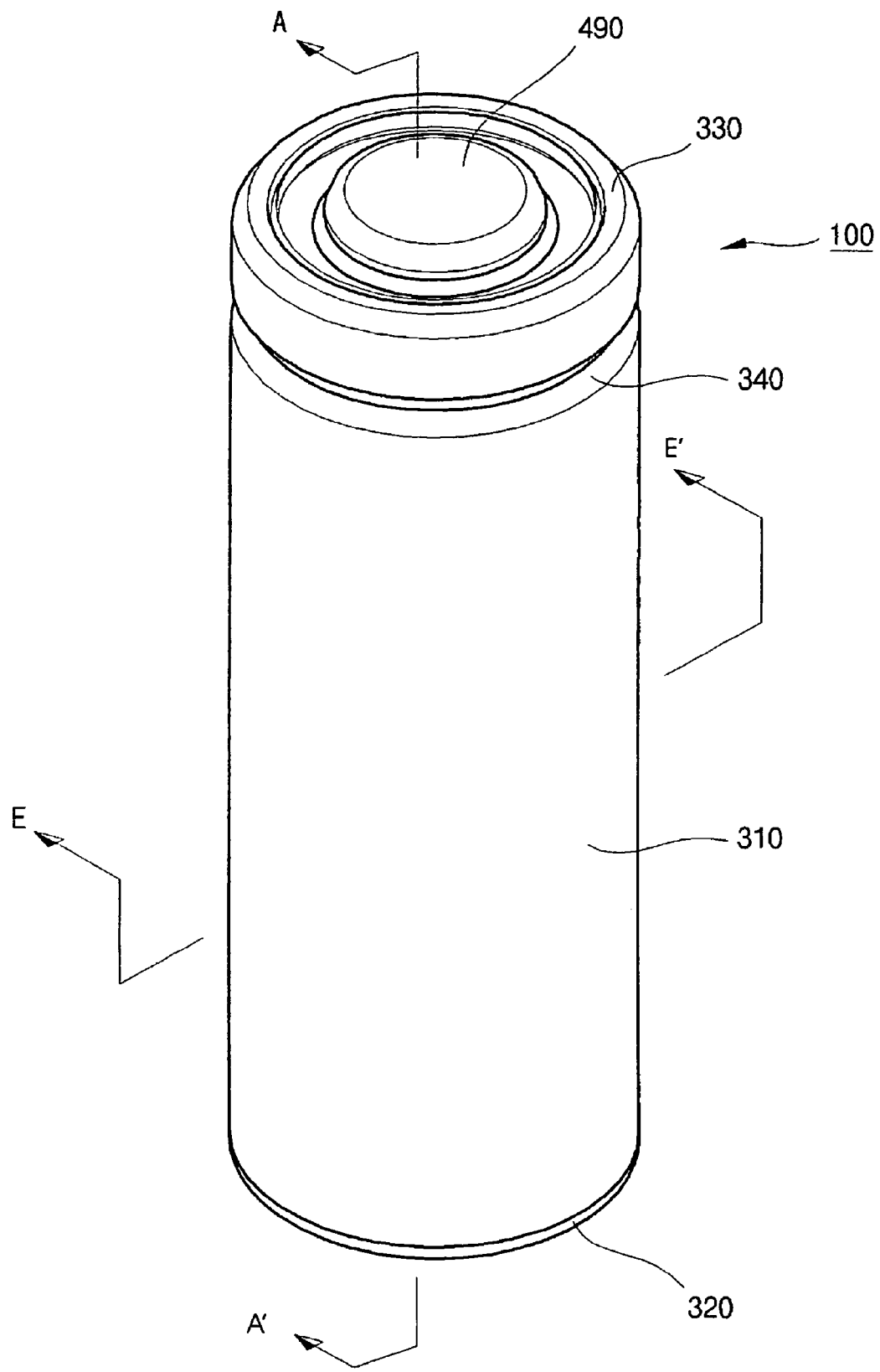
FIG. 1 is a perspective view of a lithium ion secondary battery according to an embodiment of the present invention.
Figure 2:
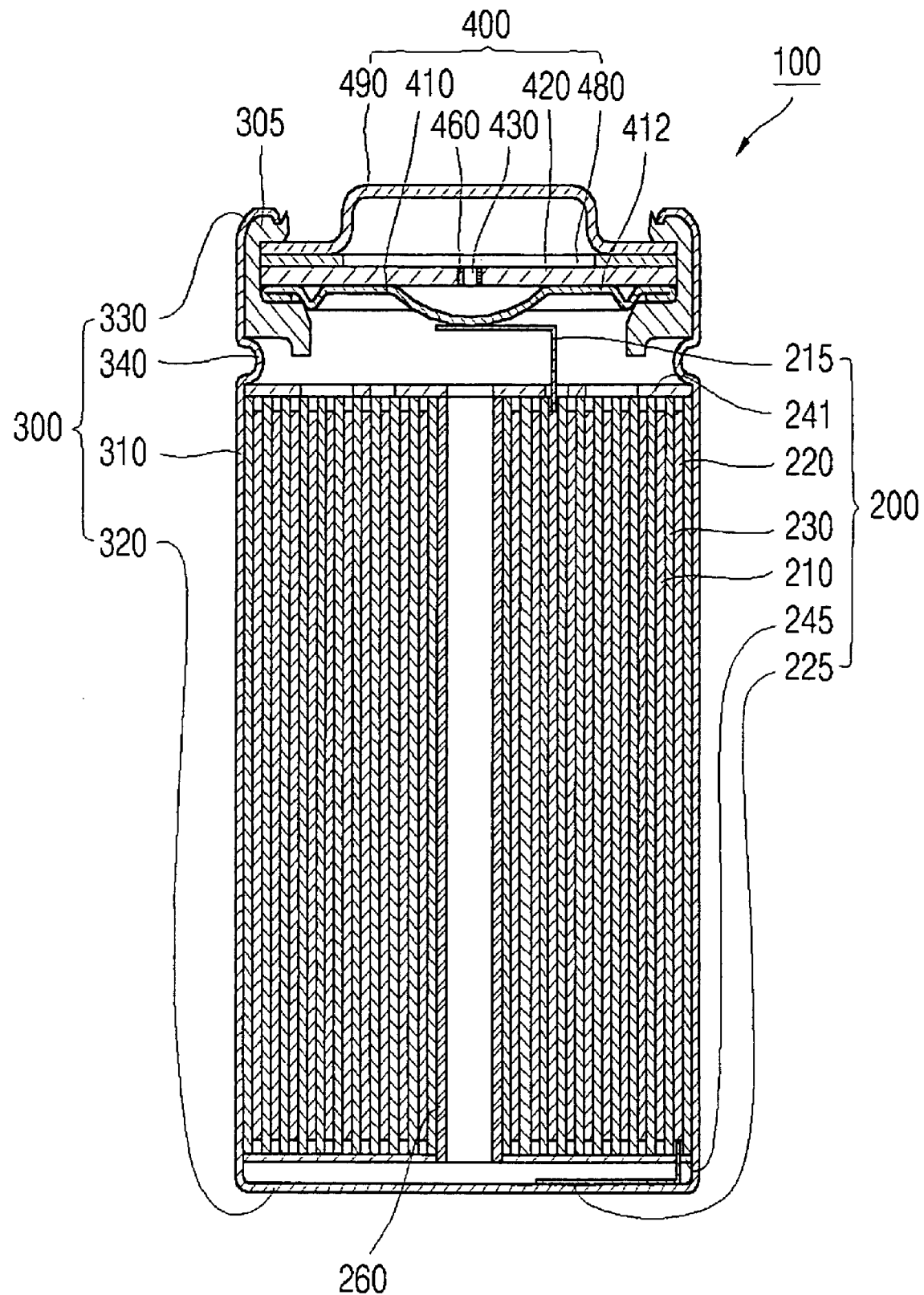
FIG. 2 is a sectional view taken along the line A-A' of FIG. 1.

FIG. 1 is a perspective view of a lithium ion secondary battery built as an embodiment of the present invention. FIG. 2 is a sectional view taken along the line A-A' of FIG. 1. For the sake of convenience, a cylinder type lithium ion secondary battery is described. However, the present invention can be applied to a polygon type lithium ion secondary battery or any equivalent type of lithium ion secondary battery.

Referring to FIGS. 1 and 2, a cylinder type lithium ion secondary battery 100 includes electrode assembly 200, cylinder type case 300 for accommodating electrode assembly 200 and an electrolyte (not shown), and cap assembly 400 installed on the upper part of cylinder type case 300 to seal cylinder type case 300 and to provide electrical current generated by electrode assembly 200 to an external apparatus.

Referring to FIG.2, electrode assembly 200 includes positive electrode plate 210, negative electrode plate 220, and separator 230. Positive electrode plate 210 includes a a positive electrode coating portion. The positive electrode coating portion is obtained by coating the surface with a positive electrode active material. Negative electrode plate 220 includes a negative electrode coating portion. The negative electrode coating portion is obtained by coating the surface with a negative electrode active material. Separator 230 is positioned between positive electrode plate 210 and negative electrode plate 220 to electrically insulate positive electrode plate 210 and negative electrode plate 220 from each other. The layers of positive electrode plate 210, negative electrode plate 220, and separator 230, wounded together forming a shape of a jelly-roll.

Although not shown in the drawing, positive electrode plate 210 may include a positive electrode collector made of a thin metal plate having excellent conductivity such as an aluminum (Al) foil, and both surfaces of the positive electrode collector are coated with a positive electrode active material. A portion of the positive electrode that is not coated with a positive electrode active material (a positive electrode non-coating portion) may be formed on both ends of positive electrode plate 210. Positive electrode tab 215 made of aluminum (Al) protrudes upwards from electrode assembly 200, and may be connected to one end of the positive electrode non-coating portion.

Also, negative electrode plate 220 may include a negative electrode collector made of a conductive metal thin plate such as a copper (Cu) or nickel (Ni) foil, and both surfaces of the negative electrode collector are coated with a negative electrode active material. A portion of the negative electrode that is not coated with a negative electrode active material (a negative electrode non-coating portion) may be formed on both ends of negative electrode plate 220. Negative electrode tab 225 extends downwards from electrode assembly 200, and may be connected to one end of the negative electrode non-coating portion.

Upper insulating plate 241 or lower insulating plate 245 may be further provided on the top or bottom of electrode assembly 200, respectively. Upper insulating plate 241 or lower insulating plate 245 prevents electrode assembly 200 from being connected to cap assembly 400 and cylinder type case 300.

Figure 3A:
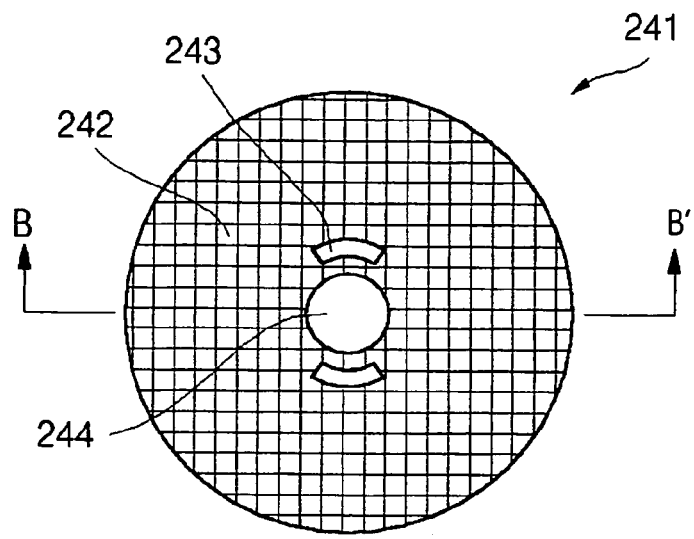
FIG. 3A is a plan view of an upper insulating plate of an embodiment of the present invention.
Figure 3B:
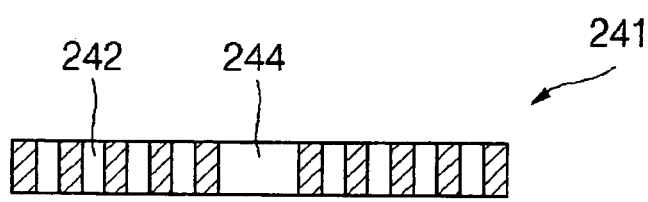
FIG. 3B is a sectional view taken along the line B-B' of FIG. 3A.

FIG. 3A is a plan view of upper insulating plate 241 constructed as an embodiment of the present invention. FIG. 3B is a sectional view taken along the line B-B' of FIG. 3A. Referring to FIGS. 2 and 3A, upper insulating plate 241 may be positioned between cap assembly 400 and the upper part of electrode assembly 200 (in particular between safety vent 410 and the upper part of electrode assembly 200). Upper insulating plate 241 prevents cap assembly 400 including safety vent 410 from being electrically connected to electrode assembly 200. For example, Upper insulating plate 241 prevents positive electrode tab 215 and electrode assembly 200 from forming a short-circuit. Referring to FIG. 3A, electrolyte holes 242, positive electrode tab holes 243, and hollow 244 may be formed in the upper insulating plate 241. Electrolyte holes 242 are paths through which an injected electrolyte flows into electrode assembly 200. Positive electrode tab holes 243 are paths through which an electrode tab such as positive electrode tab 215 penetrates. Hollow 244 may be connected to one end of a center pin.

Electrolyte holes 242 may be in the form of a mesh or in the form equivalent to the mesh. Therefore, great number of electrolyte holes 242 are formed on upper insulating plate 241. When an electrolyte is injected, the battery is easily impregnated with the electrolyte through electrolyte holes 242. Electrolyte holes 242 may have any size as long as it is possible to prevent electrical contact of the upper part of electrode assembly 200 from safety vent 410. It also should be noted that the number of electrolyte holes 242 maybe inversely proportional to the size of electrolyte holes 242. That is, when the size of electrolyte holes 242 increases, the number of electrolyte holes 242 is reduced. When the size of electrolyte holes 242 is reduced, the number of electrolyte holes 242 increases.

Upper insulating plate 241 may be made of a poorly soluble material and a highly soluble material. The poorly soluble material includes a polyolefin based resin such as polyethylene (PE), polypropylene (PP), or polyimide (PI). Because the polyethylene (PE) has low density and loose arrangement of molecules, the polyethylene (PE) is easily extended, and has weak tensile strength and strong shock resistance. Therefore, the polyethylene (PE) can be easily processed. Also, since the polyethylene (PE) is made of only hydro-carbon ($CH_2$), electrical insulating property is excellent. Since the polyethylene (PE) is symmetrical based on the chain of carbon (C) as illustrated in a constitutional formula, the polyethylene (PE) is suitable for a high frequency insulating material.

The polypropylene (PP) has an isotactic structure, and a methyl group is arranged in the same direction as illustrated in the constitutional formula. Crystallinity is large before molding but is reduced after molding. The electric characteristics of the polypropylene (PP) and the polyimide (PI) are similar to the electric characteristics of the polyethylene (PE).

Because difference in surface energies between the polyethylene (PE) and a non-aqueous electrolyte is large, polyethylene (PE) is not easily coupled with the electrolyte molecules, and the polyethylene (PE) is a poorly soluble and does not have an affinity for the electrolyte.

The highly soluble materials include a polymer material such as polyvinyldifluride (hereinafter, PVdF) or a polymer compound including a functional atom group such as an ester group and a carboxy group. The highly soluble materials are easily wet by the electrolyte and the electrolyte is easily diffused into the highly soluble materials, so that the highly soluble materials have an excellent affinity for the electrolyte. Therefore, when the upper insulating plate 241 is made of the polyethylene (PE) or the polypropylene (PP), the surface of upper insulating plate 241 is preferably coated with the PvdF in order to improve the impregnation of the electrolyte. From experiments on the impregnation of the electrolyte, it is found that PVdF 761 and PVdF 2801 are the polyvinyldifluorides, which the non-aqueous electrolyte is easily diffused into and are easily wet by the non-aqueous electrolyte. Therefore, the coating material of the insulating plate is preferably one of PVdF761, PVdF2801, and a compound of PVdF 761 and PVdF2801. Characteristics of the coated surface is changed even when the thickness of PVdF coating is within 1 μm or when the PVdF is formed as a monolayer.

When the upper insulating plate is made of polyethylene (PE), in order to compensate the fact that polyethylene (PE) does not have an affinity for the electrolyte, polyethylene (PE) may be processed in the form of compressed felt. The felt is obtained by not performing a webbing process on fiber, and therefore fibers in the felt are arranged parallel to each other in a certain direction, and are combined with synthetic resin adhesives, so that the felt absorbs liquid like a material that is used to make a diaper or a damp towel. Polyethylene (PE) and polypropylene (PP) are directly used to be processed as the compressed felt, so that the absorption of the electrolyte is improved and the electrode assembly is impregnated with the electrolyte included in the upper insulating plate.

Figure 4A:
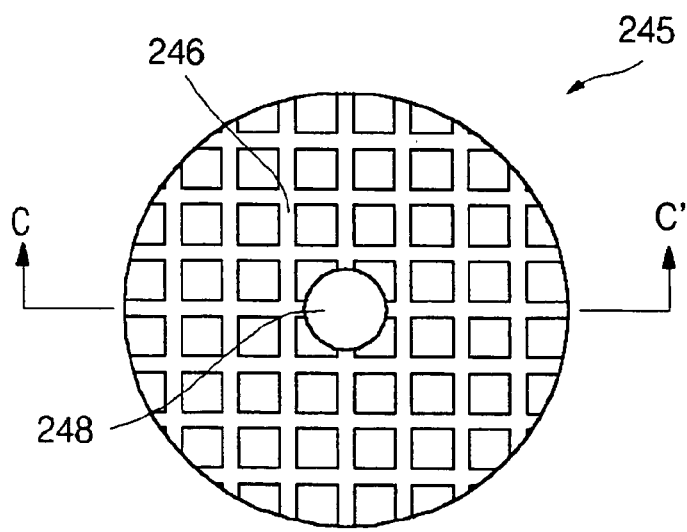
FIG. 4A is a plan view of a lower insulating plate of an embodiment of the present invention.
Figure 4B:
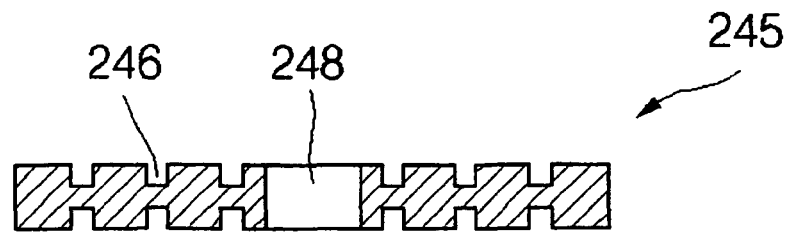
FIG. 4B is a sectional view taken along the line C-C' of FIG. 4A.

FIG. 4A is a plan view of lower insulating plate 245 constructed as an embodiment of the present invention. FIG. 4B is a sectional view taken along the line C-C' of FIG. 4A. Referring to FIGS. 2 and 4A, lower insulating plate 245 may be positioned between lower surface plate 320 of the case and lower part of electrode assembly 200. Lower insulating plate 245 prevents case 300 including lower surface plate 320 from being electrically connected to electrode assembly 200. For example, lower insulating plate 245 prevents negative electrode tab 225 and electrode assembly 200 from forming a short-circuit. Referring to FIG. 4A, a lower hollow 248 connected to one end of a center pin may be formed.

Recesses of check pattern 246 with a predetermined depth may be formed on lower insulating plate 245. Herein, depth of a recess is defined as a height between the surface of the lower insulating plate 245 and the bottom of the recess formed inside the lower insulating plate 245. Recesses of check pattern 246 may be formed only on the surface contacting electrode assembly 200 or, as illustrated in FIG. 4B, may be formed on both surfaces of lower insulating plate 245. Each of recesses of check pattern 246 are connected to one another, so that an electrolyte freely flow through the entire recesses of check pattern 246 formed on the lower insulating plate 245.

Lower insulating plate 245 is attached to the lower part of electrode assembly 200 and lower plate 320 of the case. Also, lower insulating plate 245 may be made of polyethylene (PE) or polypropylene (PP) that does not have affinity for the electrolyte. Therefore, when the surface of lower insulating plate 245 is flat without recesses, an electrolyte hardly flows into a space between lower plate 320 and lower insulating plate 245 of the case, and into a space between lower part of electrode assembly 200 and lower insulating plate 245 of the case. As a result, electrode assembly 200 is not well impregnated with the electrolyte.

However, when recesses of check pattern 246 are formed on the surface of lower insulating plate 245, an electrolyte flows to the inside of the recess, so that the electrolyte directly contacts lower part of electrode assembly 200. Therefore, electrode assembly 200 is well impregnated with the electrolyte.

Like the above-described upper insulating plate 241, lower insulating plate 245 may be made of a poorly soluble material or a highly soluble material. At this time, when the lower insulating plate 245 is made of the poorly soluble material such as the polyethylene (PE) or the polypropylene (PP), the surface of the lower insulating plate 245 is preferably coated with PVdF in order to improve the impregnation of the electrolyte. When the surface of the lower insulating plate is coated with a polymer material that has an affinity for the electrolyte, it is possible to improve a permeation speed and an impregnation speed of the electrolyte because of the affinity for the electrolyte which the surface of the insulating plate has. Even though the thickness of PVdF is within 1 μm or PVdF is formed in a monolayer, the characteristics of the PVdF-coated surface are changed.

Also, when lower insulating plate 245 is made of polyethylene (PE), like in the above-described upper insulating plate 241, in order to compensate the fact that polyethylene (PE) does not have an affinity for the electrolyte, polyethylene (PE) may be processed as compressed felt.

Referring to FIG. 2, cylinder type case 300 includes cylinder type side plate 310, which has a predetermined diameter in order to accommodate cylinder type electrode assembly 200 in a predetermined space, and lower surface plate 320 for sealing the lower part of cylinder type side plate 310. The upper part of cylinder type side plate 310 may be opened so that electrode assembly 200 is inserted. Negative electrode tab 225 of electrode assembly 200 may be connected to the center of lower surface plate 320 of cylinder type case 300 so that cylinder type case 300 may function as a negative electrode. Cylinder type case 300 may be made of aluminum (Al), steel (Fe), or an alloy of these metals. However, the material of cylinder type case 300 is not limited to the above listed materials. Furthermore, in cylinder type case 300, crimping unit 330, which is curved inside at the upper end, may be formed to press and hold the upper part of cap assembly 400. Cylinder case 300 may include a beading unit 340 that is recessed inward to press the lower part of cap assembly 400. Beading unit 340 is placed between crimping unit 330 and side plate 310, and surrounds a space formed between cap assembly 400 and upper insulating plate 241.

Referring to FIG. 2, cap assembly 400 may include safety vent 410, current intercepting unit 420, secondary protecting device 480, and upper cap 490. A concave portion, which is recessed downwards, may be formed in the center of the plate-shaped safety vent 410. Therefore, the concave portion may be pushed upward by pressure generated inside the secondary battery. One electrode tab such as positive electrode tab 215 contacts the concave portion of safety vent 410, or an electrode plate (a positive or negative electrode plate) may be directly connected to the concave portion of safety vent 410. For example, positive electrode plate 210 may be welded to the predetermined position of the lower surface of safety vent 410, so that safety vent 410 and positive electrode plate 210 of electrode assembly 200 may be electrically connected. In this case, the other electrode plate (for example, negative electrode plate 220) may directly contact case 300 to be electrically connected to case 300. In lower insulating plate 245 shown in FIGS. 4A and 4B, a through hole or a recess may be formed (not shown) to allow negative electrode tab 225 to pass through the lower insulating plate 245 and to make negative electrode tab 225 contact lower surface plate 320 of the case 300.

Figure 5A:
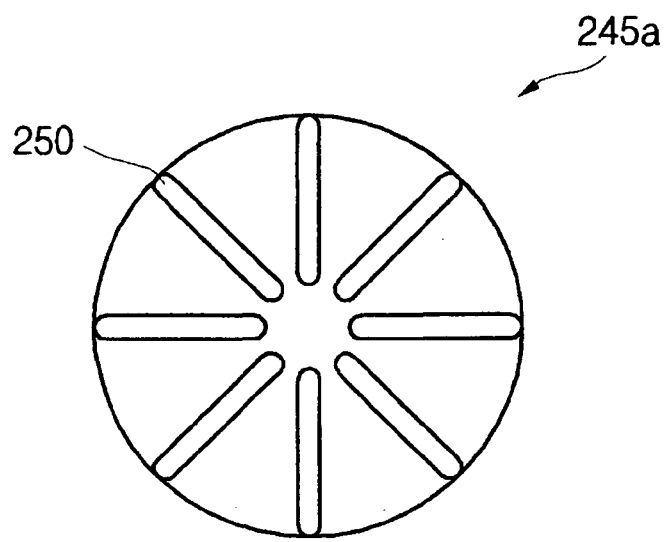
FIG. 5A is a plan view of a lower insulating plate of another embodiment of the present invention.
Figure 5B:
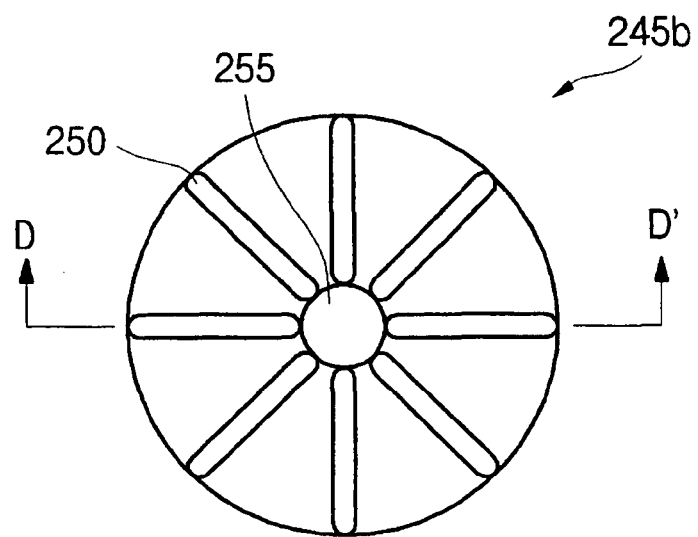
FIG. 5B is a plan view of a lower insulating plate of another embodiment of the present invention.
Figure 5C:
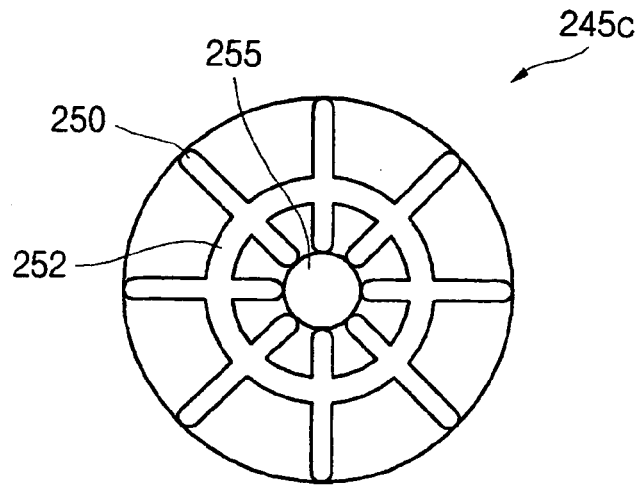
FIG. 5C is a plan view of a lower insulating plate of another embodiment of the present invention.

FIG. 5A is a plan view of a lower insulating plate constructed as another embodiment of the present invention. FIG. 5B is a plan view of a lower insulating plate constructed as another embodiment of the present invention. FIG. 5C is a plan view of a lower insulating plate constructed as another embodiment of the present invention.

Referring to FIG. 5A, radial recesses 250 with a predetermined depth may be formed at least on one surface of lower insulating plate 245*a*. Radial recesses 250 may be formed linearly spreading out from the center of lower insulating plate 245*a* to the outermost circumference of insulating plate 245*a*. In FIG. 5A, the number of radial recesses 250 is 8. However, this is only an example, and the number of radial recesses 250 is not limited to the above number. Herein, a pattern formed of the radial recesses is defined as a radial pattern.

It is necessary that radial recesses 250 are deeply formed as long as lower insulating plate 245*a* is not deformed and damaged. This is because an electrolyte is provided to electrode assembly 200 through radial recesses 250. When an electrolyte is injected into case 300, the electrolyte flows to the lower part of case 300 through spaces between the center of electrode assembly 200 and the outer circumference of electrode assembly 200, and spaces between the outer circumference of electrode assembly 200 and the side plate 310 of the case 300, and spaces between the electrode plates and the separator, and so on. If the surface of the lower insulating plate is flat without recessed portion to be attached to the lower part of the electrode assembly, a space between the lower insulating plate and the lower part of the electrode assembly, where an electrolyte flows, is not large enough, and therefore the electrode assembly is not sufficiently impregnated with the electrolyte contained in the lower part of the case and the electrolyte remains in the lower part of the case.

On the other hand, in lower insulating plate 245*a* built as an embodiment of the present invention, an electrolyte flown to the lower part of case 300 is contained in the radial recesses 250 formed on the surface of lower insulating plate 245*a*. The electrolyte contained in radial recesses 250 is drawn into the lower part of electrode assembly 200 by capillary force, and fills the spaces between the electrode plates of the electrode assembly and between the electrode plate and the separator.

Referring to FIG. 5B, hollow 255 may be formed in the center of lower insulating plate 245*b* of another embodiment of the present invention, when a center pin is mounted. In this case, radial recesses 250 may be formed linearly spreading out from hollow 255 to the outermost circumference.

Figure 6A:
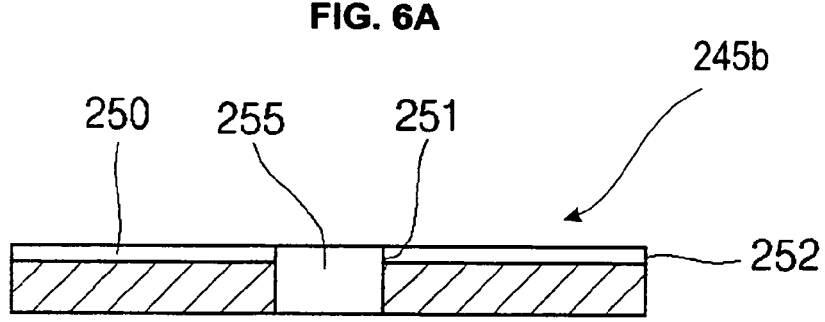
FIG. 6A is a sectional view taken along the line D-D' of the lower insulating plate of FIG. 5B having a recess on one surface.

FIG. 6A is a sectional view taken along the line D-D' of the lower insulating plate of FIG. 5B. Referring to FIG. 6A, an electrolyte flown into radial recesses 250 formed on lower insulating plate 245*b* is sealed by walls 251 and 252 formed on the both ends of radial recesses 250. Electrode assembly 200 is impregnated with the electrolyte that stays in radial recesses 250, so that it is possible to prevent the electrolyte from flowing into a space between lower insulating plate 245*b* and lower part of the case 300.

Referring to FIG. 5C, in lower insulating plate 245*c* of another embodiment of the present invention, circular recess 252 is further formed on lower insulating plate 245*c* between hollow 255 and the circumference of lower insulating plate 245*c*. Circular recess 252 is concentric to the circumference of lower insulating plate 245*c*. The circular recess 252 may cross radial recesses 250, and the recesses of circular recess 252 and redial recesses 250 are all connected. Circular recess 252 prevents the electrolyte from staying only in some of radial recesses 250, so that an electrolyte evenly spread into the entire recesses. Also, the plane shape of circular recess 252 is similar to the plane shape of the wound electrode assembly, so that the electrode assembly can be effectively impregnated with an electrolyte. The number of circular recesses 252 may be one as illustrated in FIG. 5C. However, a plurality of circular recesses 252 may be formed, and the number of circular recesses 252 is not limited.

Figure 6B:
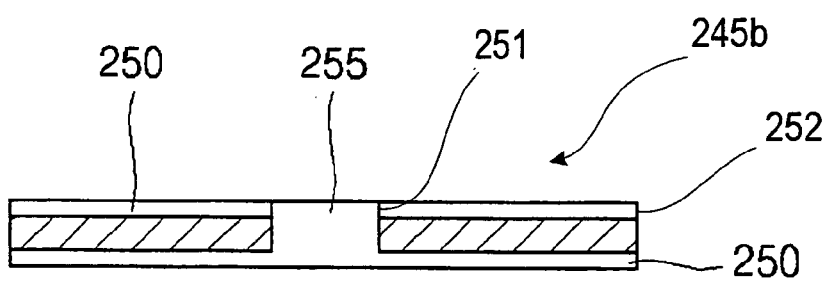
FIG. 6B is a sectional view taken along the line D-D' of the lower insulating plate of FIG. 5B having a recess on both surfaces.

Referring to FIG. 6B, radial recesses 250 may be formed on both surfaces of lower insulating plate 245*b*. In this case, walls 251 and 252 illustrated in FIG. 6A are formed on the surface of lower insulating plate 245*b* contacting the lower part of assembly electrode 200, so that it is possible to prevent the electrolyte from flowing under lower insulating plate 245*b*. Therefore, an electrolyte freely moves to electrode assembly 200, so that it is possible to improve the impregnation of the electrolyte. Furthermore, the structure in which radial recesses 250 are formed on both surfaces could be applied to lower insulating plates 245*a* and 245*c* illustrated in FIGS. FIG. 5A and FIG. 5C.

Lower insulating plates 245*a*, 245*b*, and 245*c* may be made of the polyolefin based resin such as polyethylene (PE) and the polypropylene (PP). Since polyethylene (PE) and polypropylene (PP) do not have an affinity for an electrolyte, the electrolyte is not easily diffused into the surface of polyethylene (PE) or polypropylene (PP) layer, and the surface is not easily wet by the electrolyte.

According to still another embodiment, in order to compensate the fact that polyethylene (PE) and polypropylene (PP) do not have an affinity for an electrolyte, polyethylene (PE) and polypropylene (PP) may be directly processed as compressed felt. The felt is obtained by not performing a webbing process on fiber, and therefore fibers in the felt are arranged parallel to each other in a certain direction, and are combined with synthetic resin adhesives, so that the felt absorbs liquid like a material that is used to make a diaper or a damp towel. The polyethylene (PE) and the polypropylene (PP) are directly used to be processed as the compressed felt, so that the absorption of the electrolyte is improved and the electrode assembly is impregnated with the electrolyte included in the lower insulating plate.

Figure 7:
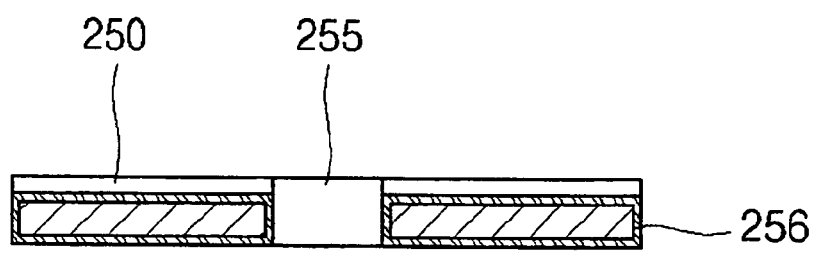
FIG. 7 is a sectional view of the lower insulating plate coated with a material having an affinity for an electrolyte.

According to still another embodiment of the present invention, the surface of the lower insulating plate that does not have an affinity for an electrolyte is coated with a material that has an affinity for the electrolyte, so that it is possible to improve the impregnation of the electrolyte. Referring to FIG. 7, thin coating layer 256, which has an affinity for an electrolyte, is formed on the surface of a lower insulating plate where radial recesses 250 are formed. Coating layer 256 may be applied to all of lower insulating plates 245*a*, 245*b*, and 245*c* illustrated in FIGS. 5A to 5C, 6A and 6B.

The material that has an affinity for the electrolyte is polyvinyldifluride (PVdF). The PVdF has a structure in which —$CH_2$—$CF_2$— is repeated, and is a polymer material used as a binder when a collector is coated with an electrode active material. From results of the experiments on the impregnation of an electrolyte, it is found that a non-aqueous electrolyte is easily diffused into PVdF 761 and PVdF 2801, and PVdF 761 and PVdF 2801 are easily wet by the non-aqueous electrolyte. Therefore, a coating material for lower insulating plates 245*a*, 245*b*, and 245*c* is preferably one of PVdF761, PVdF2801, and a compound of PVdF 761 and PVdF2801. It is also found that even though the thickness of PVdF layer is within 1 μm or PVdF layer is formed in a monolayer, the PvdF-coated surface of the lower insulating plate has the same characteristics as described above.

Figure 8:
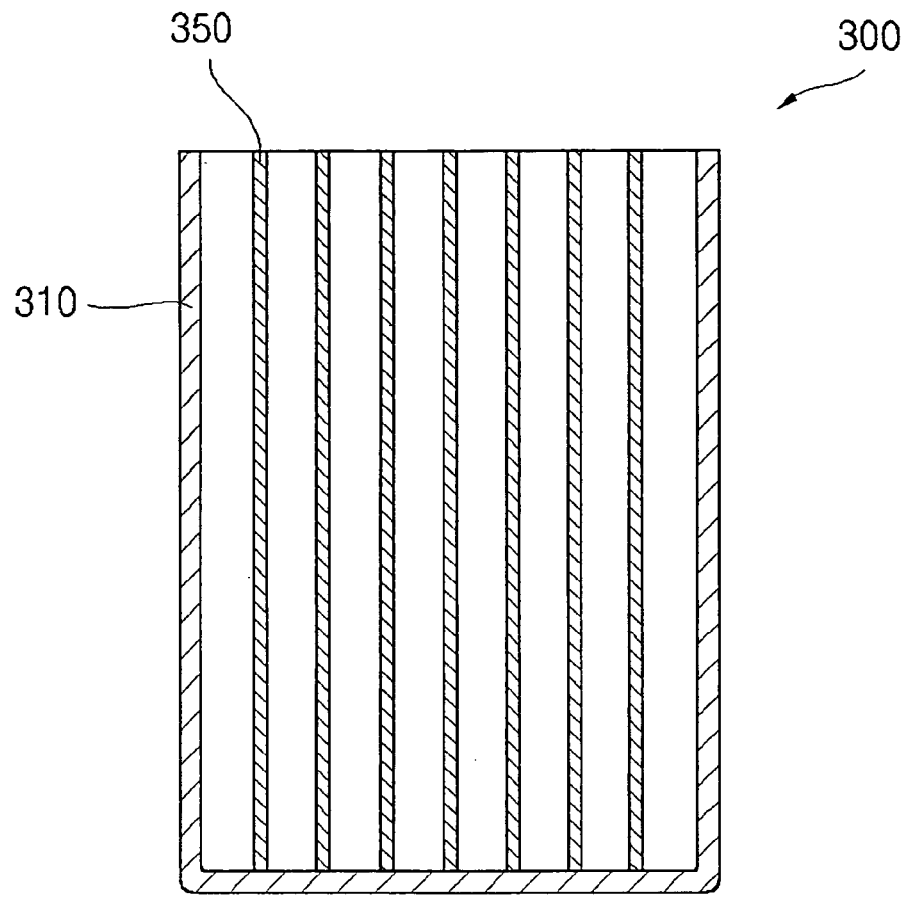
FIG. 8 is a sectional view illustrating the shape of a case shown in FIG. 2 before beading and crimping units are installed.
Figure 11:
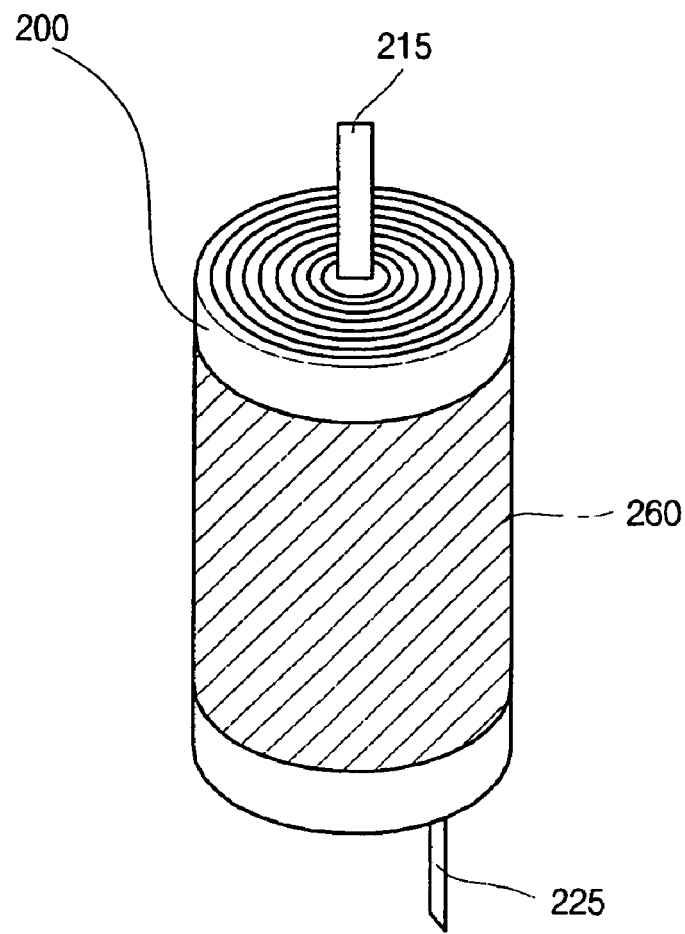
FIG. 11 is a perspective view of an electrode assembly on which a sealing tape coated with PVdF is wrapped according to principles of an embodiment of the present invention.

Meanwhile, groove 350 may be formed in an inner surface of case 300 as shown in FIG. 8. FIG. 8 is a sectional view illustrating only the case depicted in FIG. 2, and shows a shape of the case before the crimping and beading units are installed. An electrolyte material, which is a medium of moving paths of lithium ions, is injected into case 300, in which electrode assembly 200 is inserted. On the outer circumference of electrode assembly 200, as shown in FIG. 11, sealing tape 260 is attached to support and protect electrode assembly 200. The inner surface of case 300 is made of material having a good affinity for an electrolyte, such as aluminum, iron, or alloy, but sealing tape 260 is made of material having a poor affinity for an electrolyte, such as polyethylene (PE), polypropylene, or the like. Moreover, when wound electrode assembly 200 is inserted in case 300, sealing tape 260 and the inner surface of case 300 closely contact each other, so that there is no space into which the electrolyte permeates. Since sealing tape 260 does not have an affinity for the electrolyte, sealing tape 260 causes weaker capillary force and therefore prevents the electrolyte from permeating into the space between sealing tape 260 and the inner surface of case 300.

Figure 9A:
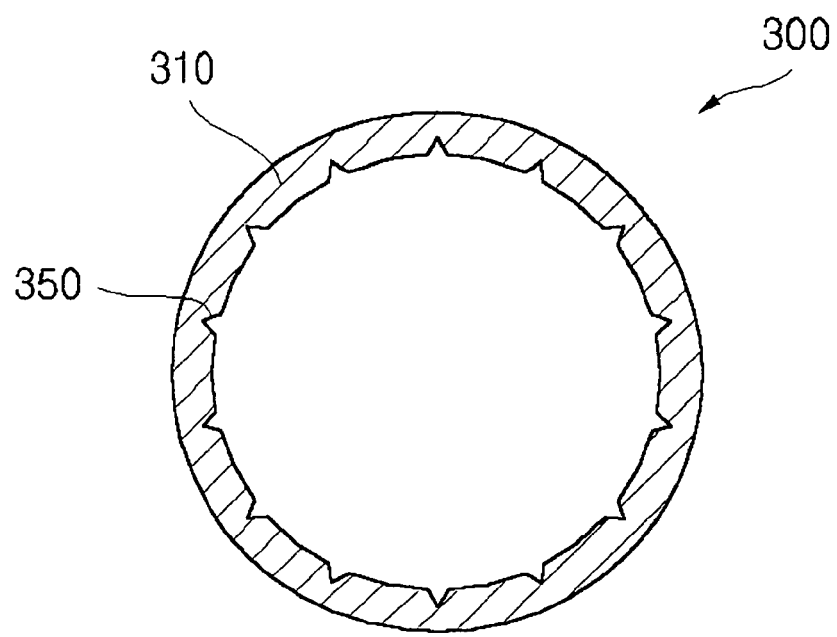
FIG. 9A is a cross-sectional view illustrating a shape of the case taken along the line E-E' of FIG. 1.
Figure 9B:
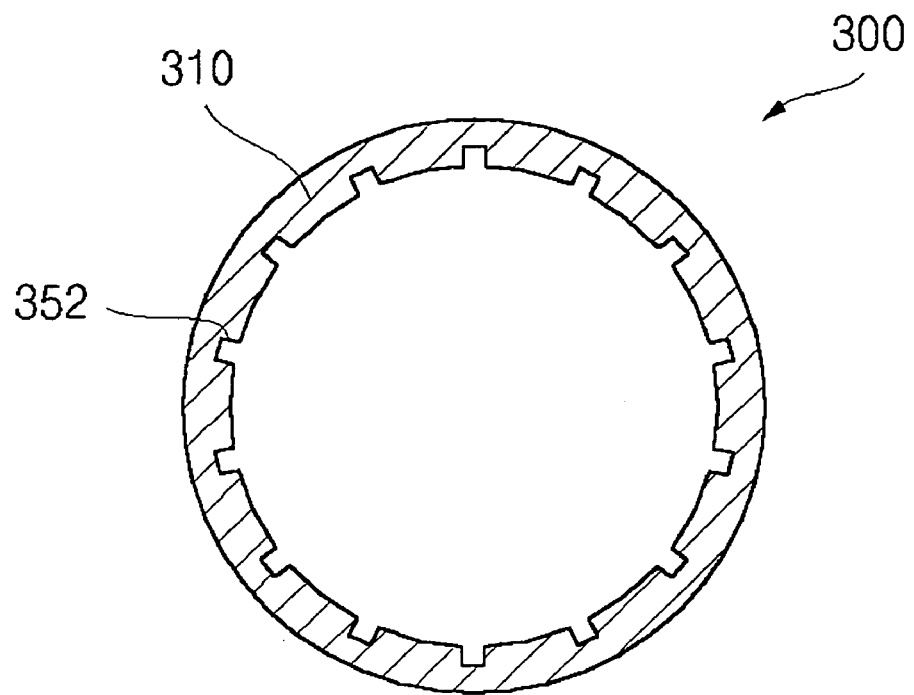
FIG. 9B is a cross-sectional view illustrating another embodiment of FIG. 9A.
Figure 9C:
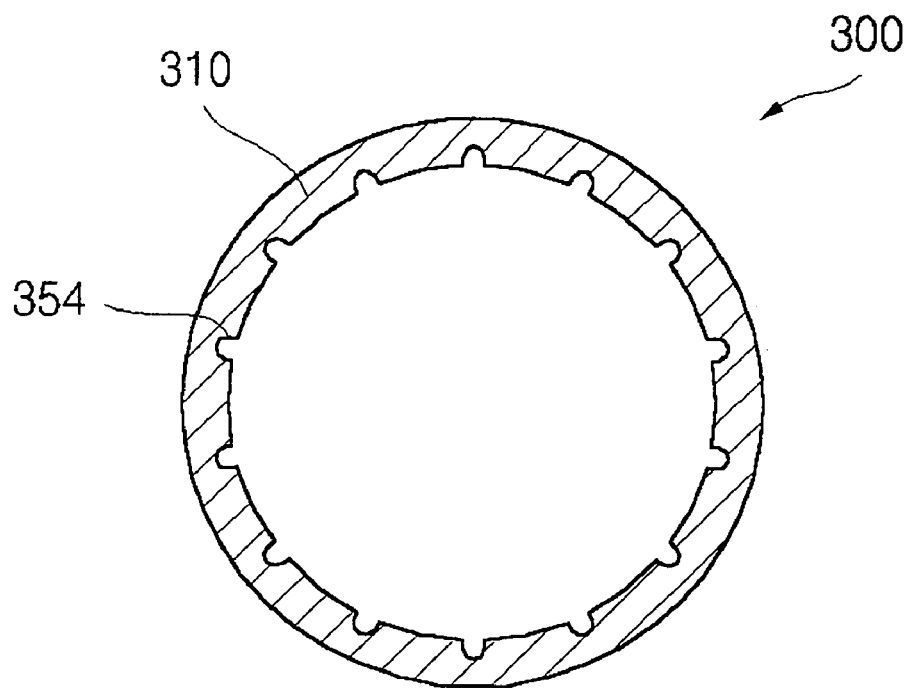
FIG. 9C is a cross-sectional view illustrating another embodiment of FIG. 9A.

In another embodiment of the present invention, a linear groove is formed on side plate 310 from the upper end to the lower end of the inner surface of the case 300. Grooves 350, 352, and 354, as shown in FIGS. 9A, 9B, and 9C, may have a triangular cross-section, a quadrilateral cross-section, or a semi-circular cross-section. The cross-section is defined as a shape of the groove as viewed from the top as shown in FIGS. 9A-9C. However, the shape of the cross-section is not limited to these shapes, and any other shape can be employed to make an electrolyte permeate grooves 350, 352, and 354. When grooves 350, 352, and 354 are formed in side plate 310, the surface area of case 300, which has better affinity for the electrolyte than sealing tape 260, increases, so that the electrolyte easily permeates into a space between sealing tape 260 and the inner surface of case 300. Herein, a groove is a long narrow channel or a long narrow hollow space cut into a surface as a general meaning, and is different from an uneven and irregular form of a surface.

As described above, when groove 350 is formed in side plate 310 of the case 300, the groove provides advantage of improving an affinity for an electrolyte, but a portion where groove 350 is formed becomes weak. When voltage of the battery increases over a limit due to overcharging, or internal temperature of the battery increases over a limit, the electrolyte is evaporated and gas is generated in the battery. The gas causes deformation or damage of safety vent 410 (shown in FIG. 2), so that the current intercepting device (CID) 420 positioned above safety vent 410 is damaged and deformed. When current intercepting device 420 is damaged or deformed, the current is intercepted to stop the overcharging.

Thus, even though gas is generated in the battery, side plate 310 should not be damaged and should not be deformed at least until safety vent 410 is operated. According to a result of experiments carried out to increase the safety of the battery, the depth of groove 350 is preferably set below about 15% of the thickness of side plate 310 of case 300. If the depth of groove 350 is greater than about 15% of the thickness of side plate 310 of case 300, side plate 310 of case 300 is deformed before current intercepting device 420 is deformed or damaged due to the deformation of safety vent 410 and the overcharging is completely stopped. Generally, since the thickness of cylindrical case 300 is about 250 μm, the depth of groove is preferably within 37.5 μm, which is about 15% of 250 μm.

Moreover, according to the result of the experiment to increase the safety of the battery, case 300 must withstand pressure greater than three times of operation pressure of safety vent 410. The operation pressure of safety vent 410 is the pressure at which the gas produced inside a battery causes deformation or damage of safety vent 410, as described above. Generally, because pressure of a battery where safety vent 410 starts to be deformed is 5 kgf/m$^2$ to 11 kgf/m$^2$, case 300 must withstand at least pressure of 15 kgf/m$^2$ even when groove 350 is formed in side plate 310.

According to another embodiment of the present invention, a lithium ion secondary battery includes electrode assembly 200, sealing tape 260 attached to the outer circumference of electrode assembly 200, case 300 for accommodating electrode assembly 200, and cap assembly 400 for sealing the upper opening of case 300. While an inner surface of case 300 is generally smooth, the inner surface of case 300 in this embodiment is made rough. Herein, the inner surface of case 300 is defined as a surface of case 300 that facing electrode assembly 200 or sealing tape 260. Instead of the smooth surface, various type of regular patterns, irregular patterns, or protrusions are formed in the surface of case 300 to make the surface rough. Therefore, the area of the inner surface of case 300 increases.

Figure 10A:
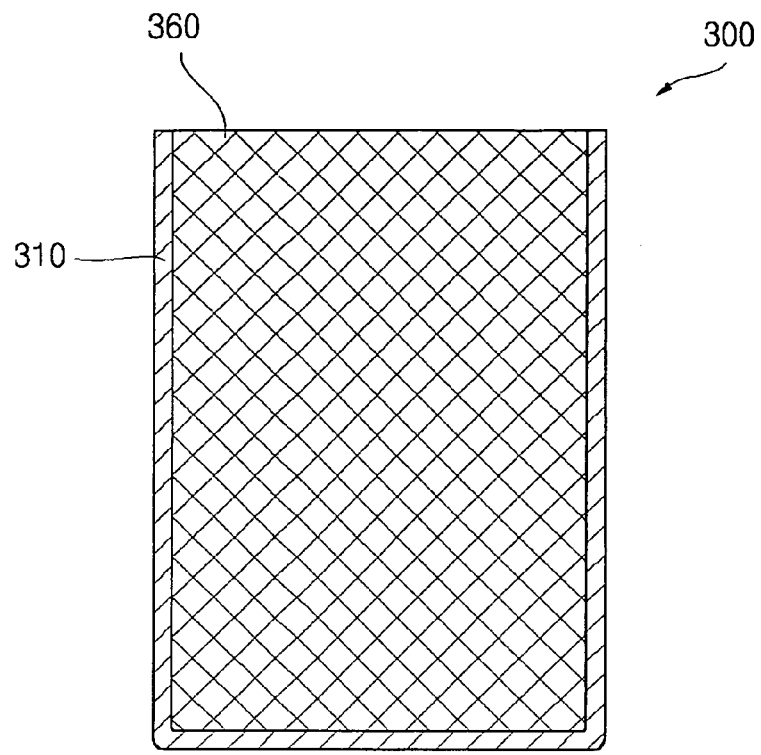
FIG. 10A is a sectional view illustrating another embodiment of FIG. 8.

As shown in FIG. 10A, sallow line patterns 360, which has a form of crossed oblique lines, may be formed on side plate 310 of case 300. In other words, the surface of side plate 310 may have a predetermined roughness. Although the rough surface of side plate 310 is illustrated by the crossed oblique sallow line patterns 360 in FIG.10A, this is an example and rough surface of side plate 310 can be formed in various type of patterns.

Figure 10B:
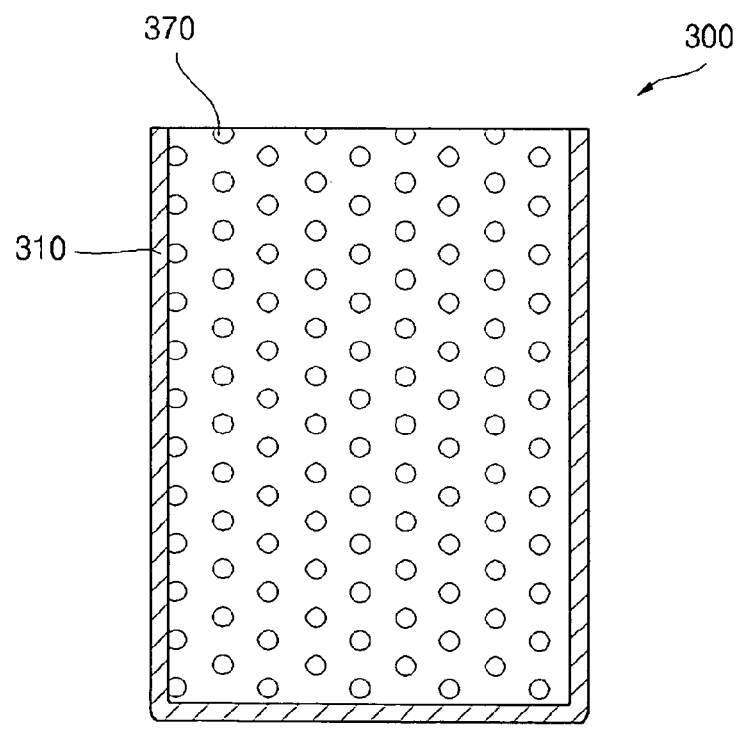
FIG. 10B is a sectional view illustrating still another embodiment of FIG. 10A.

Moreover, as shown in FIG. 10B, in order to make the surface of side plate 310 rough, a plurality of protrusions 370 may be formed. When the line patterns or the protrusions are formed in the surface of side plate 310 to make the surface of side plate 310 rough, the surface area of case 300 having a good affinity for an electrolyte is increased, so that the effect of the sealing tape 260 attached to the outer circumference of electrode assembly 200 becomes relatively weak. Thus, the permeating rate of the electrolyte can be increased.

Figure 12:
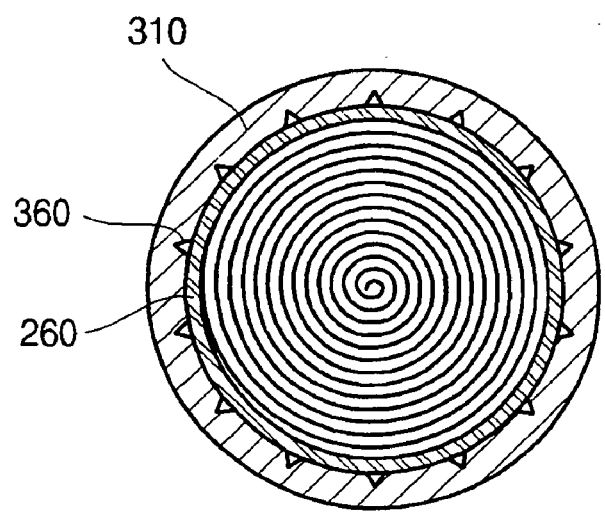
FIG. 12 is a cross-sectional view illustrating the electrode assembly of FIG. 11 inserted into the case of FIG. 10A.

FIG. 11 is a perspective view of electrode assembly 200 in which sealing tape 260 is attached to the outer circumference of electrode assembly 200, and FIG. 12 is a sectional view illustrating a shape in which electrode assembly 200 of FIG. 11 is inserted into a case including side plate 310 with rough surface. Referring to FIG. 11, a positive electrode plate and a negative electrode plate facing each other and a separator interposed between the positive electrode plate and the negative electrode plate are wound in a cylindrical shape, and positive electrode tab 215 and negative electrode tab 225 protrude from the upper side and the lower side of electrode assembly 200. An edge of the separator, which has been wound from the center of electrode assembly 200 with the positive and negative plate, is exposed on the outer circumference of electrode assembly 200. In order to prevent the wound electrode assembly 200 from being released, sealing tape 260 is attached to both of the edge of the separator and the outer circumference of electrode assembly 200.

As shown in FIG. 12, the electrode assembly to which sealing tape 260 is attached is inserted into the case. The inner surface of side plate 310 of the case has rough surface. Thus, even when sealing tape 260 closely contacts the inner surface of side plate 310, a predetermined space is formed between sealing tape 260 and side plate 310. Through this space, an electrolyte is injected, and the injected electrolyte permeates into the lower side of the case due to cohesive force between molecules and capillary force.

In this case, in order to further increase a rate of permeation of an electrolyte, the surface of sealing tape 260 may be coated with material having a good affinity for an electrolyte. As described above, one of the materials having a good affinity for the electrolyte is polyvinylidene fluoride (PVdF). The polyvinylidene fluoride (PVdF) has a structure of —$CH_2$—$CF_2$— chains, and is a polymer material used as a binder when electrode active material is coated to a collector. As a result of an experiment for an impregnation of an electrolyte, it is found that one of the polyvinylidene fluorides (PVdF) having good characteristics of diffusion and good wettability with non-aqueous electrolyte is PVdF 761 or PVdF 2801. Thus, it is preferred to use one of PVdF 761, PVdF 2801, or a mixture of PVdF 761 and PVdF 2801 as a PVdF for coating the surface of sealing tape 260.

Although a few embodiments of the present invention have been shown and described, it would be appreciated by those skilled in the art that changes might be made in this embodiment without departing from the principles and spirit of the invention, the scope of which is defined in the claims and their equivalents.

In the lithium ion secondary battery built according to the principles of the present invention, a battery structure is provided to increase permeation speed and impregnation speed of an electrolyte, where the electrolyte spread into an electrode assembly from an upper insulating plate and a lower insulating plate that cover the upper and lower surfaces of the battery. Therefore, an electrolyte spreads uniformly through entire volume of electrode assembly of the battery, which will make the impregnation of the electrolyte uniform, and will increase the impregnation speed of the electrolyte. As the impregnation of the electrolyte is improved, it is possible to reduce the time required for the impregnation process that is a large part of the entire process time, and to improve productivity.

In another lithium ion secondary battery built according to the principles of the present invention, radial recesses are formed on at least one side of the lower insulating plate. The radial recesses are used as paths of an electrolyte to flow into the electrode assembly, so that it is possible to improve the impregnation of the electrolyte.

In another lithium ion secondary battery built according to the principles of the present invention, the upper insulating plate and the lower insulating plate are coated with the material that has an affinity for the electrolyte, so that it is possible to improve the impregnation of the electrolyte.

In another lithium ion secondary battery constructed according to the principles of the present invention, a recess formed on the inner surface of the case, so that the permeation speed of the electrolyte is improved. The inner surface may be made rough to increase the area of the inner surface of the case that has an affinity for the electrolyte, so that it is possible to improve the impregnation of the electrolyte.

In another lithium ion secondary battery according to the present invention, the sealing tape that wraps the electrode assembly is coated with the material that has an affinity for the electrolyte so that it is possible to improve the impregnation of the electrolyte.

What is claimed is:

1. A lithium ion secondary battery comprising:
   a case having an open top end and a closed bottom end;
   an electrode assembly disposed inside the case;
   a cap assembly disposed on the top end of the case, the cap assembly sealing the open top end of the case; and
   a lower insulating plate disposed between the electrode assembly and the bottom end of the case, a recess with a depth formed on a surface of the lower insulating plate, a surface of the lower insulating plate being coated with polyvinyldifluride (PVdf) material.

2. The lithium ion secondary battery as claimed in claim 1, comprised of the recess including a check pattern.

3. The lithium ion secondary battery as claimed in claim 1, comprised of the recess including a radial pattern.

4. The lithium ion secondary battery as claimed in claim 1, wherein a material of the lower insulating plate is one selected from the group consisting of polyethylene (PE) and polypropylene (PP).

5. The lithium ion secondary battery as claimed in claim 1, comprised of the lower insulating plate being made of compressed felt.

6. The lithium ion secondary battery as claimed in claim 1, comprised of the lower insulating plate having a hollow on the center.

7. The lithium ion secondary battery as claimed in claim 6, comprised of the recess including a radial pattern.

8. The lithium ion secondary battery as claimed in claim 7, comprised of the recess including a circular recess encircling the hollow.

9. The lithium ion secondary battery as claimed in claim 1, comprised of the surface of the lower insulating plate being a surface of the lower insulating plate facing the electrode assembly.

10. A lithium ion secondary battery comprising:
    a case having an open top end and a closed bottom end;
    an electrode assembly disposed inside the case;
    a cap assembly disposed on the top end of the case, the cap assembly sealing the open top end of the case; and
    a lower insulating plate disposed between the electrode assembly and the bottom end of the case, a recess with a depth formed on a surface of the lower insulating plate; and
    an upper insulating plate disposed between the electrode assembly and the cap assembly, the upper insulating plate having a plurality of holes, a surface of one of the lower insulating plate and the upper insulating plate being coated with polyvinyldifluride (PVdF) material.

11. The lithium ion secondary battery as claimed in claim 10, comprised of the holes of the upper insulating plate including a form of a mesh.

12. The lithium ion secondary battery as claimed in claim 10, wherein the upper insulating plate is made of polyethylene (PE) or polypropylene (PP), and the lower insulating plate is made of polyethylene (PE) or polypropylene (PP).

13. The lithium ion secondary battery as claimed in claim 10, wherein the upper insulating plate and the lower insulating plate are made of compressed felt.

14. The lithium ion secondary battery as claimed in claim 10, wherein another of the upper insulating plate and the lower insulating plate is coated with the polyvinyldifluride (PVdF) material.

15. A lithium ion secondary battery comprising:
    a case having an open top end and a closed bottom end;
    an electrode assembly disposed inside the case;
    a cap assembly disposed on the top end of the case, the cap assembly sealing the open top end of the case; and
    a sealing tape wrapping the outer circumference of the electrode assembly, an inner surface of the case having a pattern of grooves having a predetermined depth where the inner surface of the case partially contacts the sealing tape, the pattern of grooves completely covering the inner surface of the case, the predetermined depth of the grooves being no more than about 15% of a thickness of the case.

16. The lithium ion secondary battery as claimed in claim 15, comprised of the grooves of the inner surface of the case including a shape of a straight line stretched from the top end of the case to the bottom end of the case.

17. The lithium ion secondary battery as claimed in claim 15, wherein the cross-section of the grooves is in a form of one selected from the group consisting of a triangle, a rectangle, and a semi-circle.

18. The lithium ion secondary battery as claimed in claim 15, wherein the predetermined depth of the grooves is no more than about 37.5 micro-meters.

19. The lithium ion secondary battery as claimed in claim 15, comprised of the cap assembly including a safety vent.

20. The lithium ion secondary battery as claimed in claim 19, comprised of the case withstanding pressure no less than about three times of operation pressure of the safety vent.

21. The lithium ion secondary battery as claimed in claim 19, comprised of the case withstanding internal pressure no less than about 15 kgf/m$^2$.

22. The lithium ion secondary battery as claimed in claim 15, comprised of the sealing tape being coated with polyvinyldifluride (PvdF) material.

23. A lithium ion secondary battery comprising:
a case having an open top end and a closed bottom end;
an electrode assembly disposed inside the case;
a cap assembly disposed on the top end of the case, the cap assembly sealing the open top end of the case; and
a sealing tape wrapping the outer circumference of the electrode assembly, an inner surface of the case having a regular pattern where the inner surface of the case partially contacts the sealing tape, the regular pattern completely covering the inner surface of the case.

24. The lithium ion secondary battery as claimed in claim 23, comprised of the regular pattern of the inner surface of the case including either a plurality of stripes or a plurality of protrusions.

25. The lithium ion secondary battery as claimed in claim 23, comprised of the sealing tape being coated with polyvinyldifluride (PVdF) material.

* * * * *